United States Patent [19]
Pollak et al.
[11] Patent Number: 4,623,411
[45] Date of Patent: Nov. 18, 1986

[54] METHOD AND APPARATUS FOR PRODUCING AND ATTACHING SEQUINS

[76] Inventors: Axel Pollak; Sondra Stein, both of 355 E. 72nd St., New York, N.Y. 10021

[21] Appl. No.: 766,946

[22] Filed: Aug. 19, 1985

[51] Int. Cl.[4] .......................... B32B 31/10; B32B 7/08
[52] U.S. Cl. ...................................... 156/93; 112/104; 112/265.1; 156/256; 156/297; 156/302; 156/518; 428/104; 428/542.2; 428/542.6
[58] Field of Search ...................... 112/104, 265.1, 406; 156/93, 256, 269, 270, 297, 299, 302, 516, 517, 518, 530; 428/104, 542.2, 542.8

[56] References Cited

U.S. PATENT DOCUMENTS

| | | | |
|---|---|---|---|
| 2,096,389 | 10/1937 | Bode | 428/41 |
| 2,453,441 | 11/1948 | LaFair | 428/67 |
| 4,427,733 | 1/1984 | Pöll et al. | 428/200 |

*Primary Examiner*—Robert A. Dawson
*Attorney, Agent, or Firm*—Ladas & Parry

[57] ABSTRACT

A method of stamping sequins from a sheet of material and substantially simultaneously attaching the stamped sequins to backing material. Apparatus for carrying out the method includes a punch and die assembly for stamping the sequins and needle and cooperating looper means for receiving and attaching the stamped sequin to backing material by an interlocking chain stitch.

28 Claims, 13 Drawing Figures

METHOD AND APPARATUS FOR PRODUCING AND ATTACHING SEQUINS

BACKGROUND OF THE INVENTION

The invention relates to a method and apparatus for producing sequins and for attaching the sequins to a backing material.

In the past it has been the practice to perform separate operations of, on the one hand, production of the sequins and, on the other hand, attachment of sequins to backing material. Prior methods of attaching sequins to a backing material have generally relied on hand sewing. It is also known to use glue to retain sequins in position.

It is an object of the invention to enable sequins to be both produced by stamping from a web of material and substantially similtaneously attached to a length of backing material with both the stamping of the sequins and the attachment thereof to the material being performed at a single station.

SUMMARY OF INVENTION

According to the present invention there is provided an apparatus for producing decorative material including frame members defining a work station, a punch and die assembly located at said work station to stamp a sequin from a web, and cooperating needle and looper means arranged at said work station to engage and attach said sequin to backing material.

According to the present invention there is further provided an apparatus for attaching a sequin to a yarn-like backing, characterized by a support frame, a die supported by said frame, a punch mounted on one side of said frame for reciprocal movement into and out of cooperation with said die, a needle aligned with said punch and reciprocably mounted on the opposite side of said frame for movement into and out of cooperation with said punch, means for feeding thread to said needle and a looper arranged to cooperate with said needle to perform a chain stitching operation, the arrangment being such in stitching operation, the arrangment being such that advance of the punch into the die will stamp a sequin out of a sheet of material supported by said frame and continued advance of said punch will carry the stamped sequin toward the needle and that advance of the needle through the yarn-like backing and toward the punch will engage the sequin whereupon retraction of the needle will withdraw the sequin past the looper to form a stitch over the sequin to attach said sequin to said yarn-like backing.

According to the further aspect of the present invention there is provided a method of producing decorative material including the steps of forming a sequin and attaching said sequin to a backing material, wherein said sequin is stamped from a web at a work station and is engaged by a stitching needle a said work station and attached to said backing material.

According to the present invention there is further provided a method of producing slung, including the steps of feeding a web to a first location in a work station, feeding a length of yarn-like material to a second location in said work station, said second location being spaced from said first location, stamping a sequin from said web, substantially simultaneously passing a threaded needle through said yarn-like material in the direction of said stamped sequin to engage said stamped sequin, withdrawing said needle and sequin until said sequin seats on said yarn-like material, completing a stitching operation to attach the sequin to said yarn-like material and thereafter incrementally advancing both web and yarn-like material through said work station and repeating the operation.

The present invention is particularly applicable to the production of slung or slung-like material. As used throughout this specification, the term "slung" denotes a string of sequins attached to a backing of thread-like material. The thread-like material is advantageously that known in the art as chainette. The sequins themselves may be plain sequins which are essentially circular in shape or fancy sequins which have a contoured configuration. In all cases, the sequins have an aperture through which thread may be passed to secure the sequins on the chainette or other backing material.

The web from which the sequins are punched may be of plastics or any other suitable material.

BRIEF DESCRIPTION OF THE DRAWINGS

Preferred embodiments of the invention will now be described by way of example and with reference to the accompanying drawings, in which.

DESCRIPTION OF THE PREFERRED EMBODIMENT

The essential features of the apparatus of the invention are depicted in FIGS. 1 through 6. For clarity, extraneous features such as, for example, the support frame, drive trains for the component parts and feed magazines or spools have been omitted.

Figure 1:
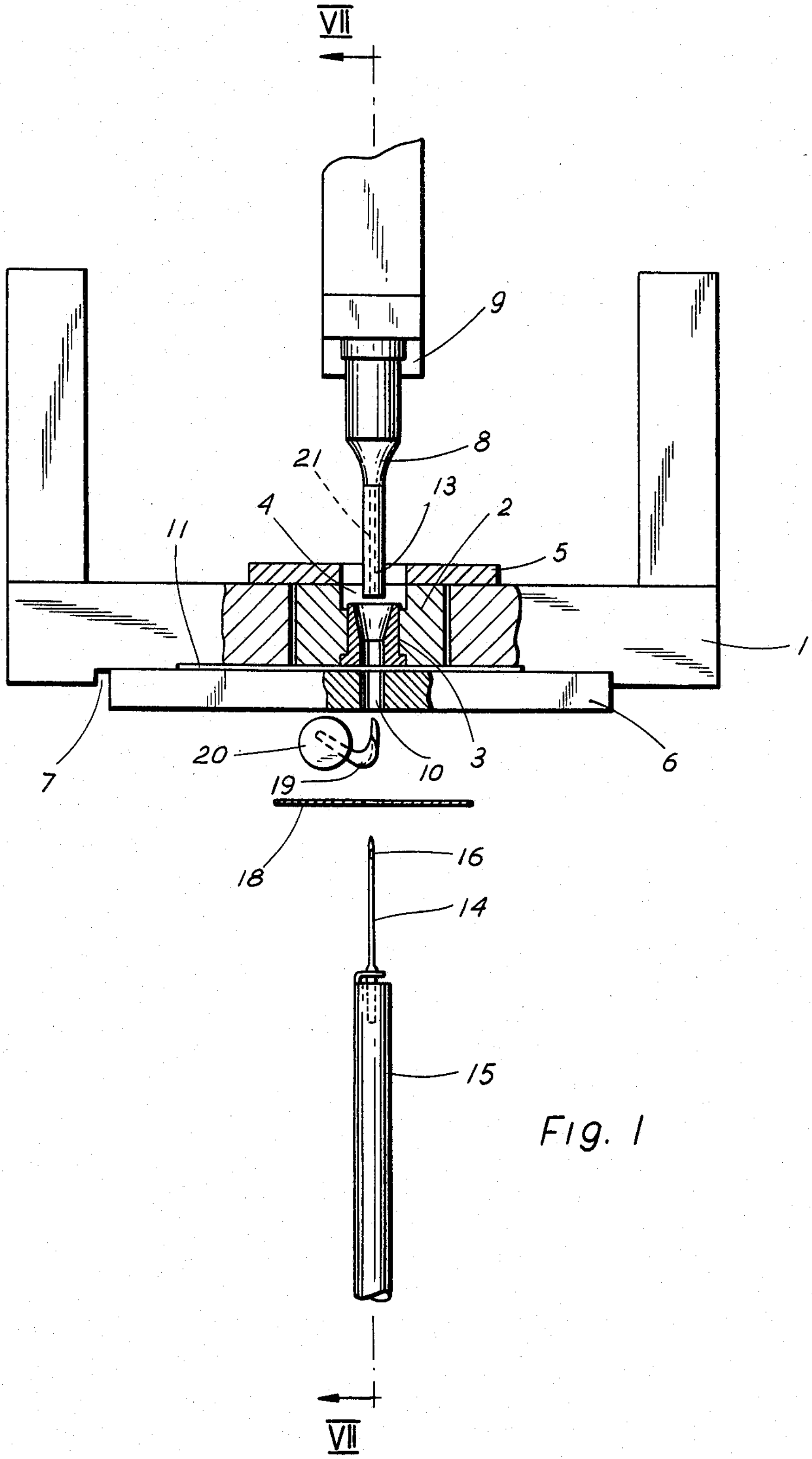
FIG. 1 is a section through one embodiment of an apparatus of the invention.

As shown in FIG. 1, the apparatus comprises a main support plate 1 which supports a guide bushing retainer 2. The guide bushing retainer 2 is seated within its main support plate 1 and retains a guide bushing 3. A plate 5 located on one side of the main support plate 1 securing the guide bushing retainer 2 in position. A matrix or die 6 is located on the opposite side of the support plate 1.

As shown in the figure, the matrix 6 can most conveniently seat in a recess 7 in the main support plate 1.

The guide bushing 3 is shown flared upwardly towards a mating punch 8 to facilitate entry of the punch 8 into the bushing 3 and matrix 6. The punch 8 is longitudinally reciprocably driven and is supported by a retainer 9.

An aperture 10 extends through the matrix 6 and is aligned with the axis of the bushing 3 whereby the leading end of the punch 8 can extend through the bushing and matrix in a manner to be hereinafter discussed in detail.

The main support plate 1 is further recessed at 11 to define a channel through which a web 12 may pass. It will be appreciated that in order for the leading end 13 of the punch 8 to enter the aperture 10 in the matrix 6, the leading end will have to pass through a web 12 disposed in the recess 11 and, in doing so, will punch or stamp a sequin from the web.

The punch and die assembly described in the preceding paragraphs is associated with a mechanism for attaching punched sequins to form a string of sequins or slung. To this end, the attaching mechanism comprises a reciprocable needle 14 carried by a needle bar 15 and presenting a needle eye 16 at its leading end which is fed with thread 17 from a spool or bobbin (not shown).

A looper 19 is carried by a rocker bar 20 for reciprocal rocking motion to and from a position cooperating with the needle 14.

The sequins produced by the cooperating punch 8 and matrix or die 6 are attached to a strand of yarn such as, for example, chainette. To this end a length of chainette is fed from a spool or other source (not shown) to pass over the surface of a the stripper plate 18 and receive the sequins in overlapping relationship at the point at which the needle 14 passes through the stripper plate. The advancing needle actually passes through the chainette as it travels towards the punch 8. FIGS. 2 to 6 of the drawings show how the chainette advances from left to right across the surface of the stripper plate 18 and is withdrawn with sequins 25 sewn thereon in overlapping relationship by a chain stitch formed by the cooperating needle 14 and looper 19 and most clearly shown in FIG. 9.

Figure 2:
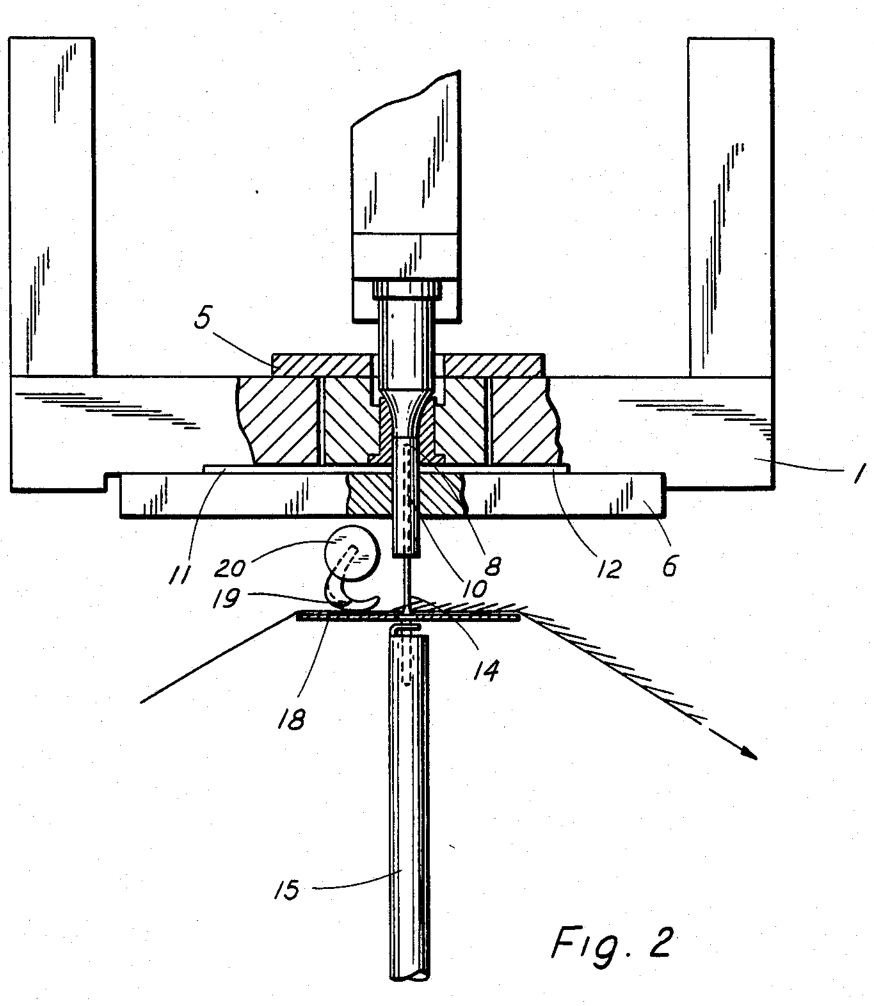
FIG. 2 is a section similar to FIG. 1 showing the component parts during an initial phase of operation.
Figure 5:
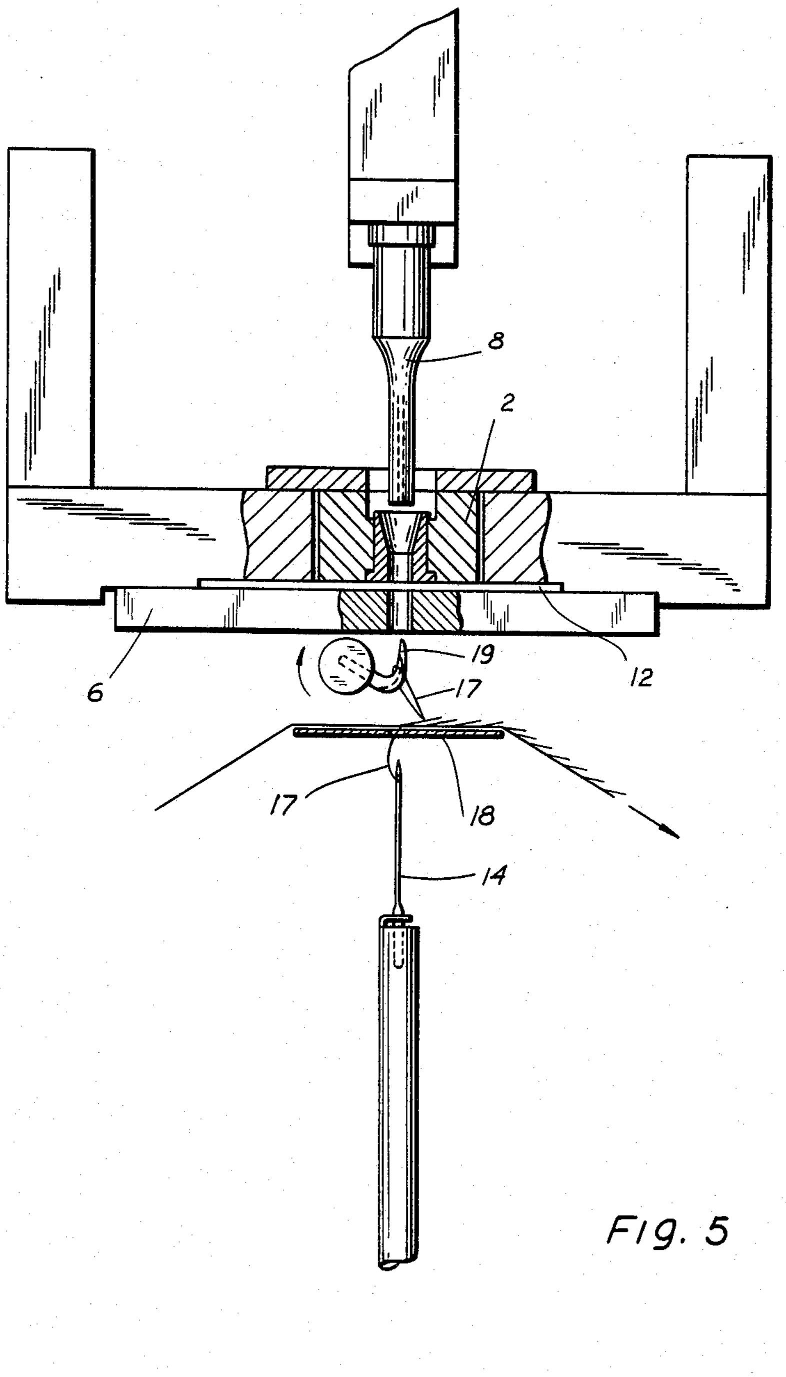
FIG. 5 is a similar section but showing the component parts in a subsequent phase of operation.

The needle reciprocates longitudinally between an advanced "bottom-dead-center" position shown in FIG. 2 and a retracted "top-dead-center" position shown in FIG. 5. The punch 8 also reciprocates longitudinally between an advanced "bottom-dead-center" position shown in FIG. 2 and a retracted "top-dead-center" position shown in FIG. 5. With both the needle and the punch in the advanced positions, the needle 14 enters a bore 21 extending longitudinally within the punch 8.

Figure 7:
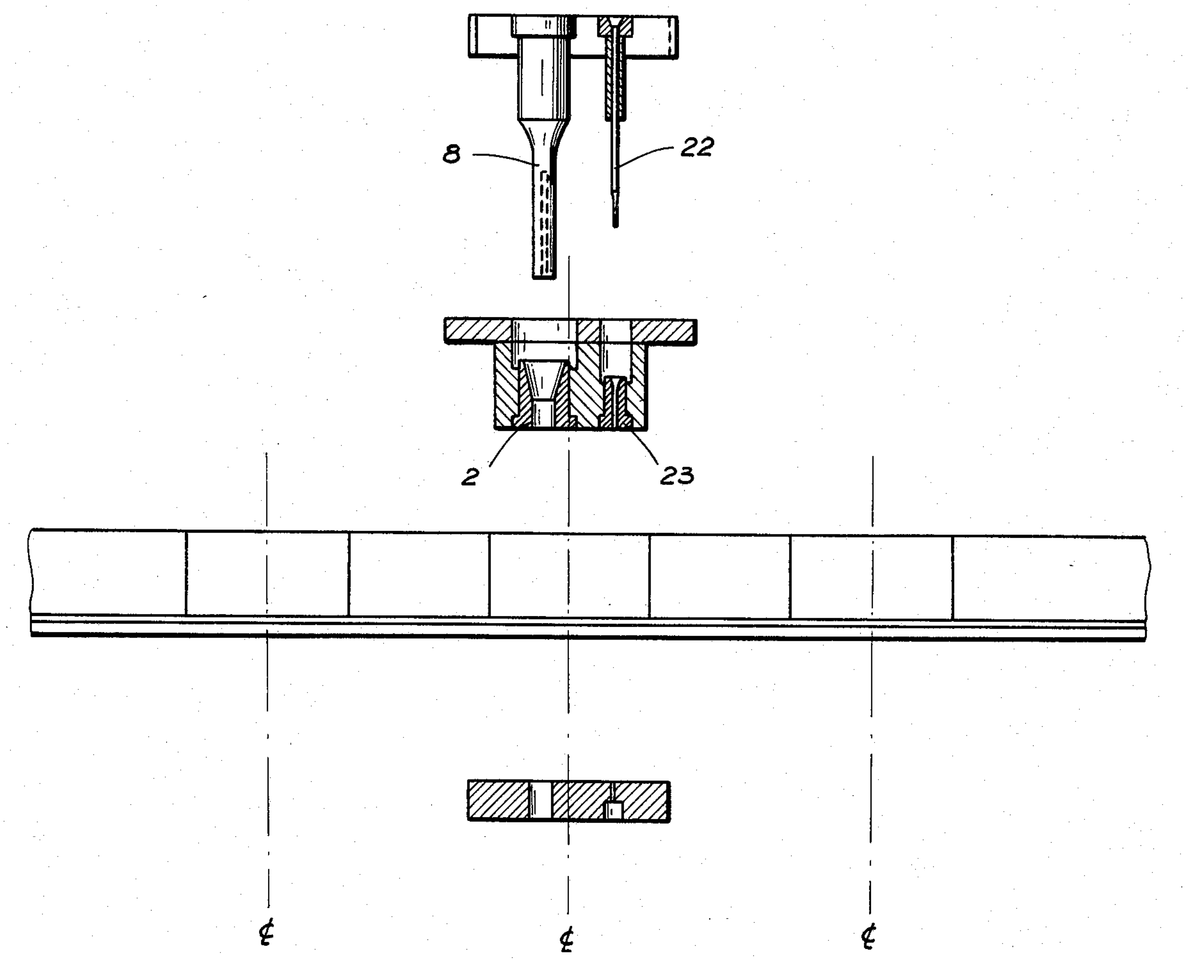
FIG. 7 is an exploded section taken generally along the line VII—VII of FIG. 1.
Figure 12:
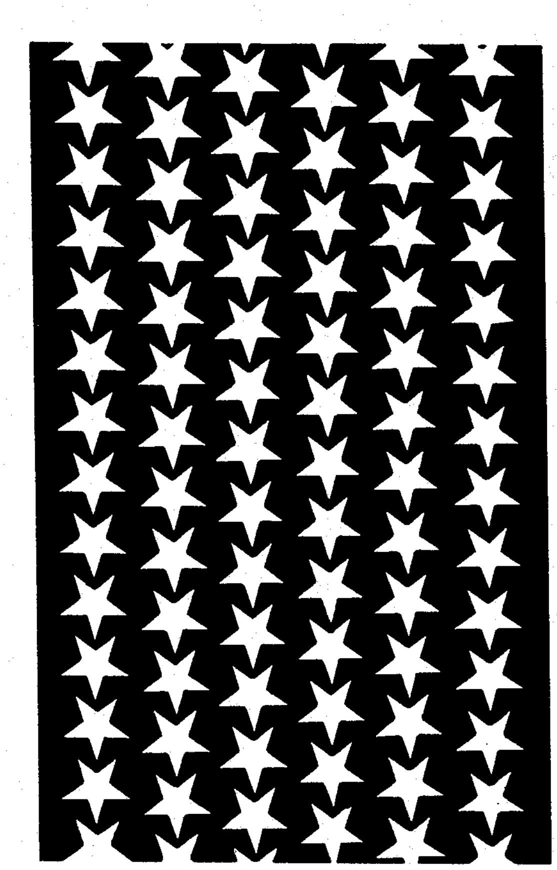
FIG. 12 shows a portion of web from which star-shaped sequins have been punched by the apparatus.

The sequins produced by the punch and die assembly are, in one form, circular discs with apertures therethrough. In the embodiments shown, these apertures are centrally located in the circular discs. However, if desired the apertures may be off center. Alternatively, as indicated in FIG. 12 of the drawings, the external periphery of the sequins may be star-shaped may be or of any other configuration such as, for example, a floral or other decorative pattern. In all cases there is an aperture and for this purpose a dual punch and die assembly is utilized. As shown in FIG. 7 of the drawings, a second, very much smaller, punch is juxtaposed with the main punch 8 and cooperates with a bushing 23 juxtaposed to the bushing 3. Both punches 8 and 22 can conveniently be carried by the punch retainer 9 with the punch 22 being disposed upstream of the punch 8 in the direction of web travel. In the production of sequins, the smaller center-hole punch 22 is known as a glitter punch and the main punch 8 is known as the sequin punch. With the glitter punch disposed upstream of the sequin punch as shown, an advancing web is first punched with the glitter punch and then subsequently punched with the sequin punch to stamp out a circular sequin with a center hole.

The sequence of operations involving the sequin punch will now be described with reference to FIGS. 2 to 7.

Referring first to FIG. 2, both the needle 14 and the punch 8 are shown in their most advanced position with the needle 14 having passed through the chainette and entered well into the bore 21 in the punch 8. The punch 8 has punched or stamped a sequin from the web 12 which travels through the recess 11 in the direction out of the paper. The leading end of the punch 8 has pushed the stamped sequin through the aperture 10 in the matrix 6 and the leading end of the needle 14 has drawn the thread through the central aperture in the sequin which, in FIG. 2, is seated flush on the leading end of the punch 8. The punch 8 extends through the web 12 and, consequently, the web 12 is stationary at this point. Finally, with regard to FIG. 2, the looper 19 is shown in a retracted and releasing position.

Figure 3:
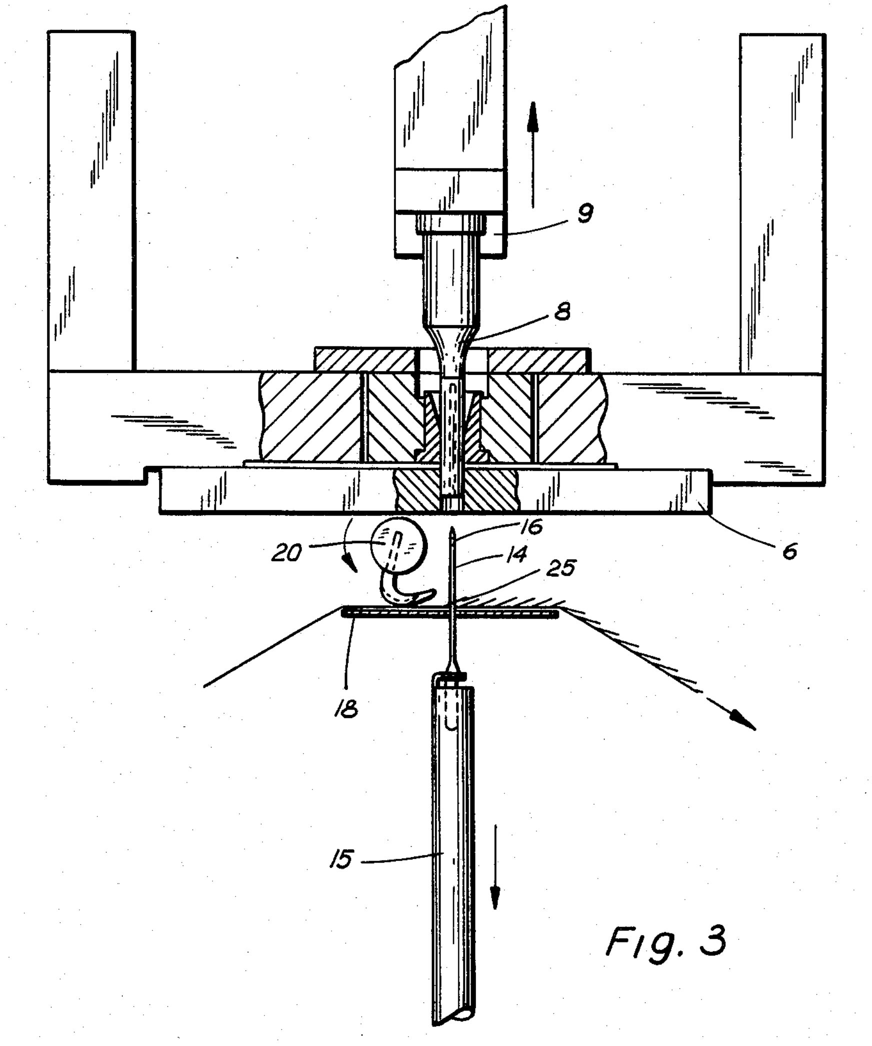
FIG. 3 is a similar section but showing the component parts in a subsequent phase of operation.

From the position shown in FIG. 2, both the needle bar 15 and the punch retainer 9 begin to move away from each other and in FIG. 3 the needle eye 16 is shown withdrawn both from the retreating punch 8 and from the matrix 6. Prior to withdrawal from the bore 21, the needle has entered the central aperture in the stamped out sequin and has engaged the sequin with a friction fit. Consequently, upon withdrawal of the needle by means of the bar 15, the sequin is removed from the leading end of the punch 8, which is similarly retreating, and is carried downwardly until it engages the stripper plate 18 at which point the sequin 25 is restrained from further movement and continued withdrawal of the needle will leave the sequin 25 seated on the stripper plate 18. FIG. 3 shows the sequin 25 at the point at which it has been carried downwardly and is engaged by the stripper plate which serves then to strip the sequin from the needle upon further downward movement of the needle. As shown in FIG. 3, the rocker bar 20 has rotated to advance the looper 19 toward the needle 14.

Figure 4:
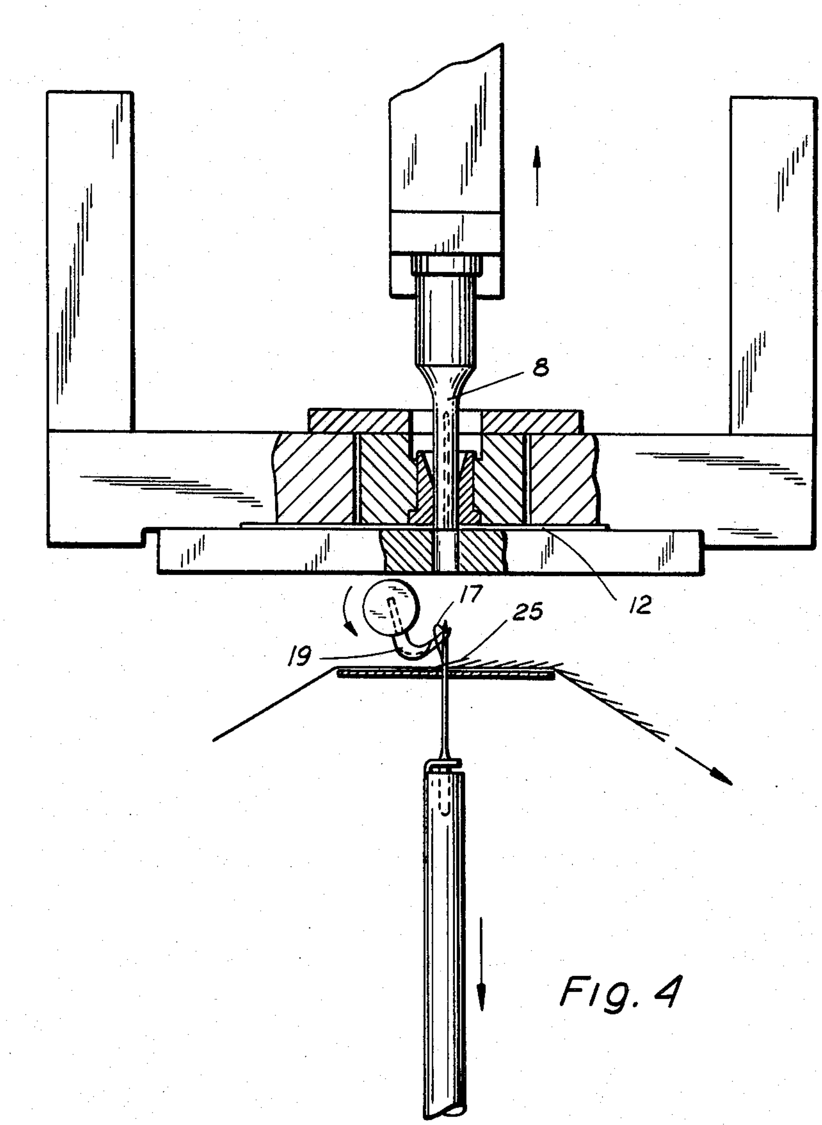
FIG. 4 is a similar section but showing the component parts in a subsequent phase of operation.

In FIG. 4 the needle 14 has retreated even further and frictional engagement with the central aperture of the sequin 25 causes a loop to be formed in the thread at the leading end of the needle. The thread is carried to the leading end of the needle along a longitudinal groove (not shown) in the needle surface and the loop is formed on the side of the needle opposite the groove. The looper has continued to advance and FIG. 4 shows how the leading point of the looper enters the loop formed in the thread to begin the formation of a chain stitch. FIG. 4 also shows how the punch 8 has been withdrawn even further and is at the point of clearing the web 12 to permit the web to advance for a further punching operation.

Figure 6:
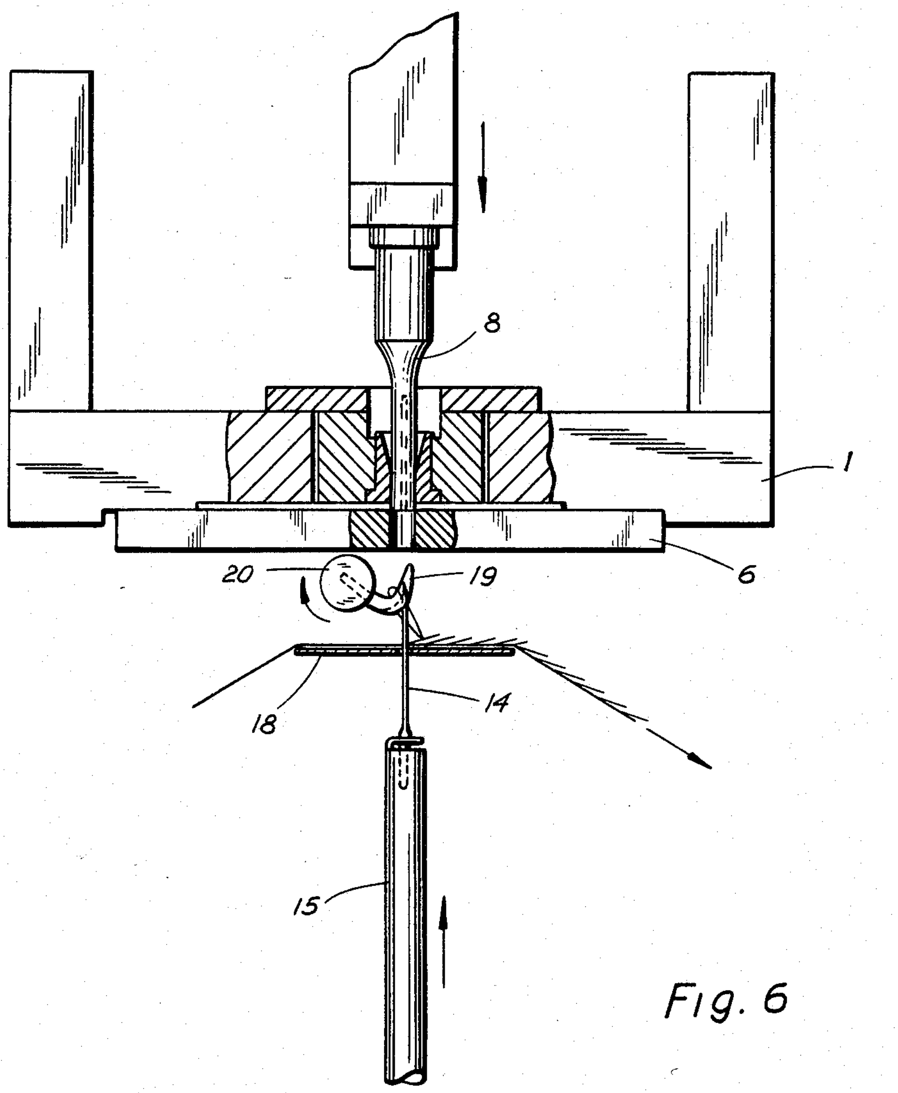
FIG. 6 is a similar section but showing the component parts in a subsequent phase of operation.

FIG. 5 shows both the needle 14 and the punch 8 in their respective extreme retracted positions previously referred to in each case as top-dead-center positions. The needle 14 is shown totally withdrawn from the stripper plate 18 and the punch 8 is similarly totally withdrawn from the matrix. At this point in the operation of the apparatus both the web 12 and the chainette are advanced, the web 12 to present a new area from which a sequin is to be stamped and the chainette to move the most recently attached sequin out of the line of travel of the needle 14 which can then advance through the chainette to encounter the punch 8 and engage and withdraw a subsequently punched sequin. FIG. 5 shows the looper 19 holding the thread 17 in a loop through which the needle can pass as the needle advances toward the matrix 6 and punch 8. FIG. 6 of the drawings shows the needle having passed through the loop formed by the looper as it follows its path of travel toward the position most clearly shown in FIG. 2 in which the looper has been withdrawn by the rocker bar 20 and the cycle recommences.

Figure 8:
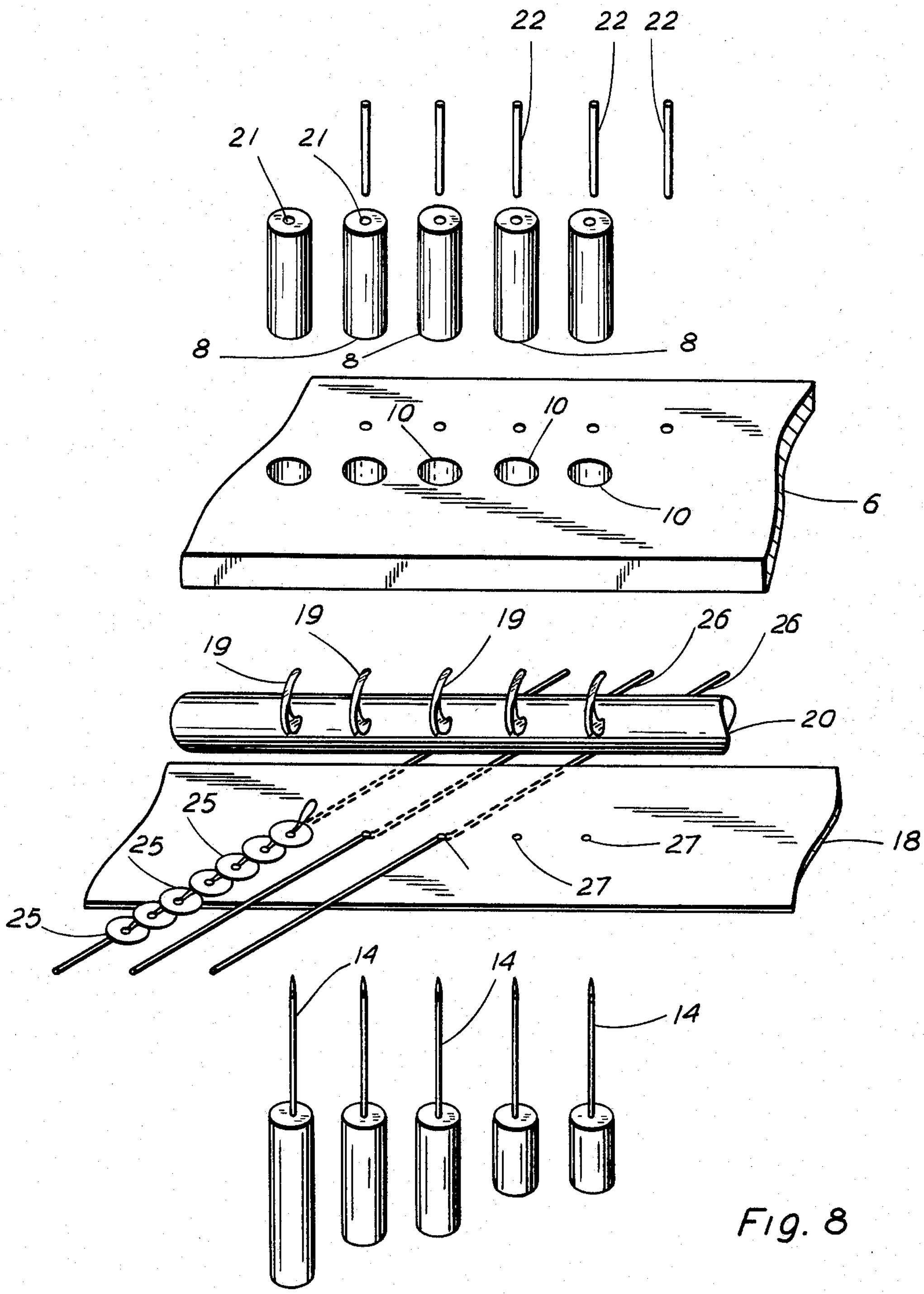
FIG. 8 is an exploded perspective view of a further embodiment of the invention illustrating the relative positions of the component parts.

FIG. 8 is an exploded perspective view of an apparatus similar to that shown in FIGS. 1 to 7. In the embodiment shown in FIG. 8, the yarn or chainette 26 is shown passing initially beneath the stripper plate 18 before passing upwardly through an aperture 27 through which the needle 14 passes at the sequin receiving station. Thereafter the yarn or chainete with the sequins 25 secured thereto continues over the upper surface of the stripper plate 18.

Figure 9:
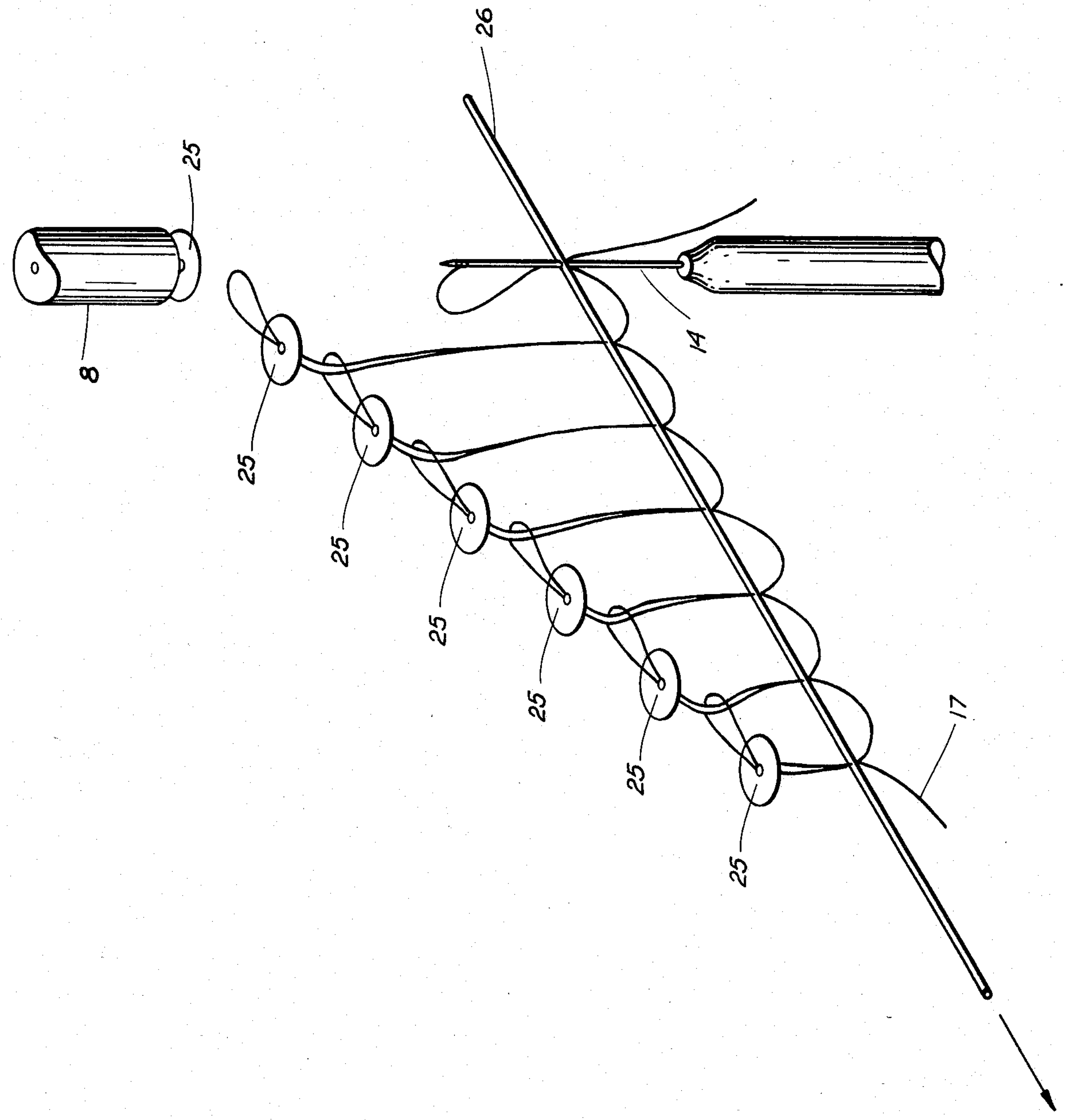
FIG. 9 is an enlarged perspective view showing the configuration of stitches produced by the apparatus.

FIG. 9 is an enlarged perspective view showing the loops of 1 through 17 constituting a chain stitch. For clarity, the loops have been shown in a loose formation and are formed by the needle 14 in conjunction with the looper 19 to attach sequins 25 formed by the punch 8 to a backing of chainette 26.

Figure 10:
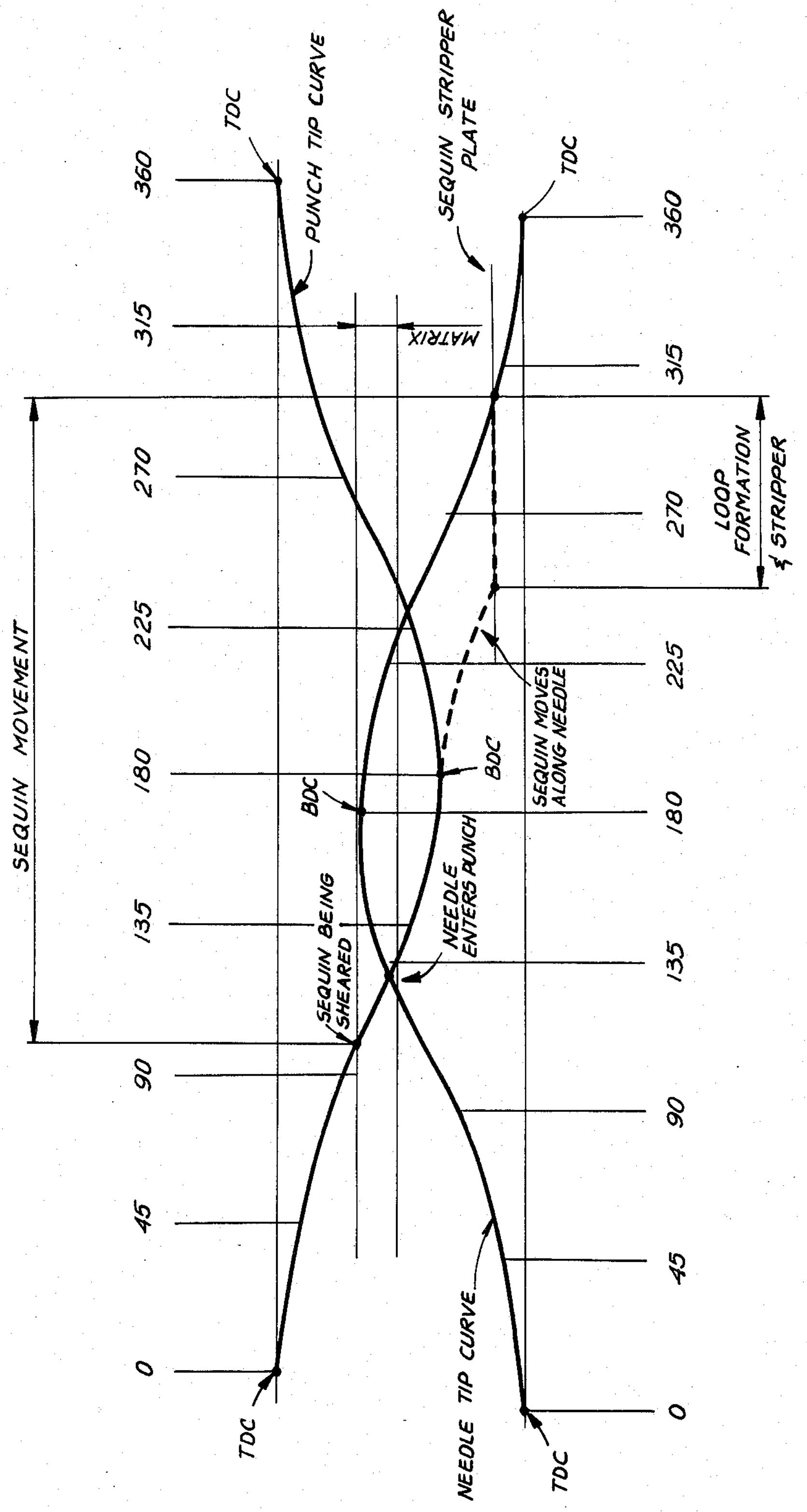
FIG. 10 is a time/flow diagram showing the synchronization of the component parts during operation.

The sequence of operations described with reference to FIGS. 2 to 6 is shown diagrammatically in FIG. 10 of the drawings in which the curve extending from the top left hand corner of the figure downwardly and then upwardly to the top right hand corner of the figure represents the path of the leading end of the punch and the curve extending upwardly from the bottom left corner of the figure and then downwardly to the bottom right hand corner of the figure represents the path of the needle tip. The cooperation of these components with respect to the matrix 6 is shown by the schematic representation of the matrix on the figure and, similarly, the cooperation of the needle tip with the sequin stripper plate is also shown. By tracing the path of the leading end of the punch from left to right in FIG. 10 it will be seen that the sequin is sheared from the web as the punch enters the matrix, the needle tip enters the punch as the punch is about to protrude through the matrix and the punched out sequin leaves the leading end of the punch as the punch begins its reversed direction of upward movement. FIG. 10 also shows the travel of the sequin from the time it is sheared from the web as the punch enters the matrix, is carried by the continued advance of the leading end of the punch, is withdrawn from the leading end of the punch by the retreating needle and is arrested from further movement upon encountering the sequin stripper plate.

Figure 11:
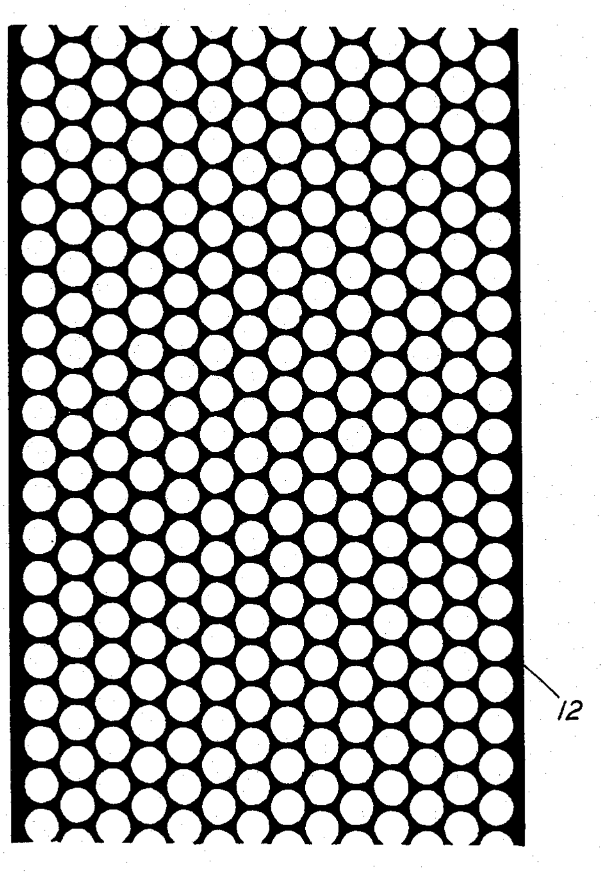
FIG. 11 shows a portion of a web from which circular sequins have been punched by the apparatus.

Referring now to FIGS. 11 and 12, not only do these figures show how different external configurations of sequins can be produced by the apparatus of the invention but they also show how by judicious arrangement of the component parts and control of the operating sequence a maximum number of sequins can be punched from a given area of web which, in turn, gives rise to a minimum wastage of material.

Figure 13:
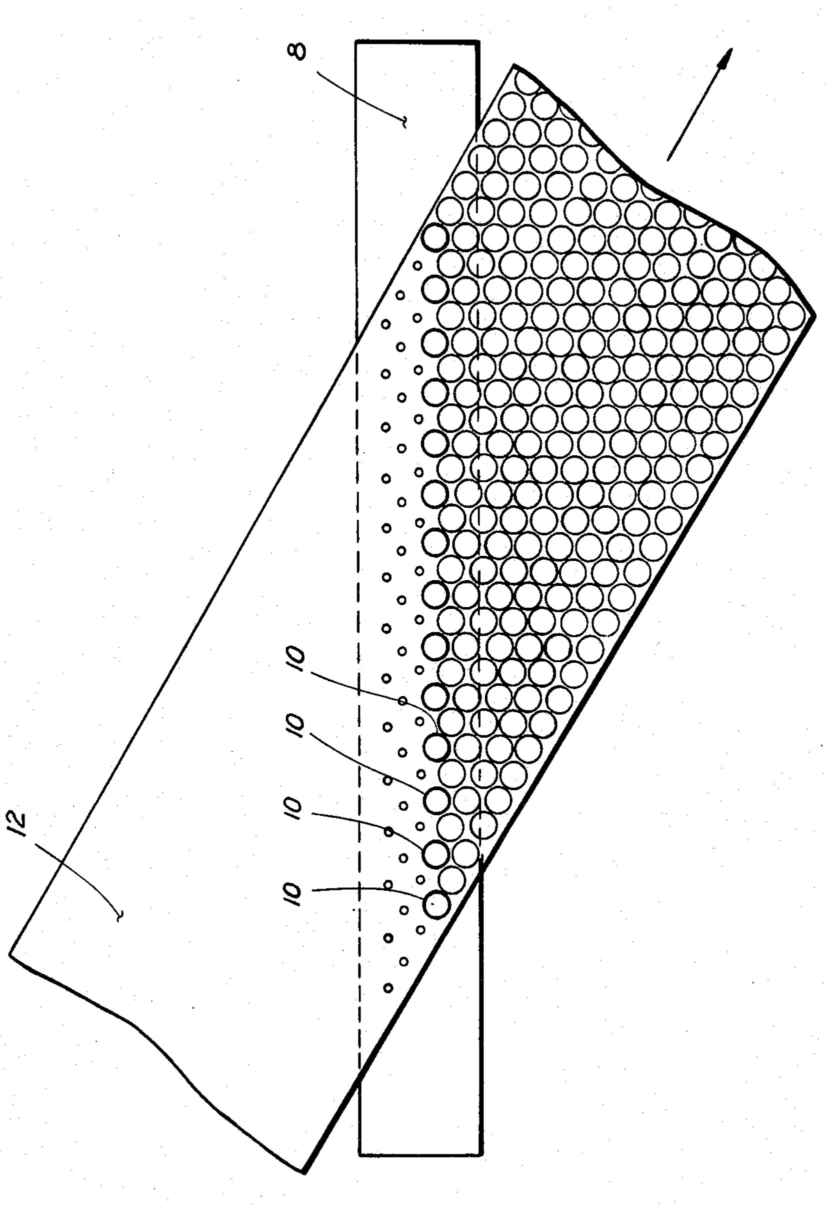
FIG. 13 shows the relative positions of components in a further embodiment.

FIG. 13 shows how this may be achieved by orientating the recess 11 at an angle across the underside of the main support plate 1 to feed the web 12 obliquely with respect to a row of aperature 10 in the matrix 8.

It is normal for the web to be a sheet of plastics material although other materials may be utilized. While only circular and star-shaped sequins are shown in FIGS. 11 and 12, it will be appreciated that sequins of any shape can be produced merely by using appropriately configured cooperating punches and dies.

Although sequins attached to backing material in the manner described are securely held in position, it may in some instances be desired to bound the needle thread and its backing. This has the advantage if either the thread should break or a loop in the chain stitch should be missed, the slung produced will remain intact and will not unravel. One preferred way to provide such a bond is to coat or dab the thread and backing with a curable adhesive. For example, a curable monomer may be applied to the thread and backing and then cured by polymerization by passing the assembly past a source of ultraviolet light.

We claim:

1. Apparatus for producing decorative material including frame members defining a work station, a punch and die assembly located at said work station to stamp a sequin from a web, and cooperating needle and looper means arranged at said work station to engage and attach said sequin to backing material.

2. Apparatus as claimed in claim 1, wherein the punch and needle are aligned in end to end relationship for reciprocation toward and away from each other.

3. Apparatus as claimed in claim 2, wherein a longitudinal centrally disposed bore opens into the leading end of the punch and wherein the needle is arranged to enter said bore as said punch and bore move to the respective advanced positions.

4. Apparatus as claimed in claim 3, wherein the die is interposed between the punch and needle and wherein, in said respective advanced positions, both said punch and needle extend through an aperture in said die which cooperates with said punch for producing said sequins from said web.

5. Apparatus as claimed in claim 4, wherein the sequin producing aperture in the die is substantially circular.

6. Apparatus as claimed in claim 4, wherein the sequin producing aperture in the die has a patterned configuration.

7. Apparatus as claimed in claim 4, wherein the die is mounted on a supporting frame member and is sufficiently spaced therefrom to define a path for travel of the web between said die and frame member as said web is fed to the work station.

8. Apparatus as claimed in claim 7, wherein the frame member supports a guide bushing for said punch to ensure alignment of said punch with the aperture in the die.

9. Apparatus as claimed in claim 7, wherein a glitter punch and cooperating die aperture are located upstream of the sequin punch and aperture in the direction of web travel in such manner that as the web advances incrementally through the work station a relatively small hole is first stamped in the web and the sequin is subsequently stamped from the web about said small hole.

10. Apparatus as claimed in claim 9, wherein the glitter punch and the sequin punch are supported by a common retainer for reciprocation in unison.

11. Apparatus as claimed in claim 9, wherein the advancing needle enters the small hole stamped by the glitter punch and estabishes a friction fit therewith whereby the stamped sequin is entrained and withdrawn by said needle, and wherein a stripper plate is located in the path of reciprocal travel of the needle and is arranged to engage and strip the sequin from the needle.

12. Apparatus as claimed in claim 11, wherein the path of travel of the backing material extends across the upper surface of the stripper plate and wherein the advancing needle passes through said stripper plate and through said backing material as said needle travels toward the die to engage and withdraw a stamped sequin.

13. Apparatus as claimed in claim 12, wherein the backing material is a yarn-like material.

14. Apparatus as claimed in claim 11, wherein the backing material is a yarn-like material and wherein the path of travel of said yarn-like material extends part way across the underside of the stripper plate, through a needle receiving aperture extending through the plate and part way across the upper side of said plate, whereby the advancing needle passes through said needle receiving aperture and through the backing material as said needle travels toward the die to engage and withdraw a stamped sequin.

15. Apparatus as claimed in claim 11, wherein a looper is arranged between the stripper plate and the die to cooperate with the needle and enter a loop of thread carried by said needle, said loop being formed as the needle withdraws through the backing material, to form a chain stitch linkage attaching the sequin to said backing material.

16. Apparatus as claimed in claim 15, wherein a plurality of needles are arranged in line for simultaneous operation and wherein a plurality of loopers are carried by a common rocker bar and arranged each to cooperate with one of said needles.

17. Apparatus for attaching a sequin to a yarn-like backing, characterized by a support frame, a die supported by said frame, a punch mounted on one side of said frame for reciprocal movement into and out of cooperation with said die, a needle aligned with said punch and reciprocably mounted on the opposite side of said frame for movement into and out of cooperation with said punch, means for feeding thread to said needle and a looper arranged to cooperate with said needle to perform a chain stitching operation, the arrangment being such that advance of the punch into the die will stamp a sequin out of a sheet of material supported by said frame and continued advance of said punch will carry the stamped sequin toward the needle and that advance of the needle through the yarn-like backing and toward the punch will engage the sequin whereupon retraction of the needle will withdraw the sequin past the looper to form a stitch over the sequin to attach said sequin to said yarn-like backing.

18. Apparatus as claimed in claim 17, wherein a plurality of punches and a corresponding plurality of needle and looper components are arranged for simultaneous operation to punch sequins from said sheet of material and attach said sequins individually to yarn-like backings.

19. A method of producing decorative material including the steps of forming a sequin and attaching said sequin to a backing material, wherein said sequin is stamped from a web at a work station and is engaged by a stitching needle at said work station and attached to said backing material.

20. A method as claimed in claim 19, wherein a circular sequin is stamped from the web at the work station.

21. A method as claimed in claim 19, wherein the sequin stamped from the web at the work station has a patterned external configuration.

22. A method as claimed in claim 19, wherein the sequin is attached to the backing material by an interlocking chain stitch.

23. A method as claimed in claim 22, including the steps of effecting two successive stamping operations at the work station, the first stamping operation being effected to produce a thread receiving aperture and the second stamping operation being effected to stamp the sequin with said thread receiving aperture being located concentrically with respect to the sequin outer periphery, and of substantially simultaneously with said second stamping operation passing a thread through the backing material and through said thread receiving aperture in the sequin and looping said thread radially over the sequin surface to attach said sequin to said backing material.

24. A method as claimed in claim 19, including the additional step of bonding the attachment of the sequin and the backing.

25. A method as claimed in claim 24, wherein the bonding is effected by applying adhesive to thread attaching the sequin to the backing material.

26. A method as claimed in claim 19, where in the backing material is a yarn-like material.

27. A method as claimed in claim 19, wherein a plurality of sequins are simultaneously stamped from the web at the work station and are substantially simultaneously engaged each by one of a plurality of needles to attach said sequins to backing material.

28. A method of producing slung, including the steps of feeding a web to a first location in a work station, feeding a length of yarn-like material to a second location in said work station, said second location being spaced from said first location, stamping a sequin from said web, substantially simultaneously passing a threaded needle through said yarn-like material in the direction of said stamped sequin to engage said stamped sequin, withdrawing said needle and sequin until said sequin seats on said yarn-like material, completing a stitching operation to attach the sequin to said yarn-like material and thereafter incrementally advancing both web and yarn-like material through said work station and repeating the operation.

* * * * *